United States Patent [19]
Porsche

[11] 3,735,114
[45] May 22, 1973

[54] HEADLIGHTS FOR VEHICLES

[75] Inventor: Ferdinand Alexander Porsche, 7031 Doffingen, Germany

[73] Assignee: Firma Dr. Ing. h. c. F. Porsche KG, Stuttgart-Zuffenhausen, Germany

[22] Filed: July 13, 1971

[21] Appl. No.: 162,128

[30] Foreign Application Priority Data

July 15, 1970 Germany..................P 20 34 997.7

[52] U.S. Cl..............................240/7.1, 240/7.1 H
[51] Int. Cl. ................................................B60q 3/00
[58] Field of Search .....................240/7.1 R, 7.1 H, 240/8.1 R, 41.6, 46.59

[56] References Cited

UNITED STATES PATENTS

| 1,347,011 | 7/1920 | Cochran | 240/7.1 H |
| 2,084,120 | 6/1937 | Ames | 240/7.1 H |
| 3,387,125 | 6/1968 | Ingolia | 240/7.1 R |
| 3,514,589 | 5/1970 | Huber | 240/7.1 X |
| 3,532,872 | 10/1970 | Hall | 240/7.1 H |
| 3,544,786 | 12/1970 | Baker | 240/7.1 H |

FOREIGN PATENTS OR APPLICATIONS

| 1,080,587 | 8/1967 | Great Britain | 240/7.1 H |
| 1,529,731 | 5/1968 | France | 240/7.1 H |

*Primary Examiner*—Louis J. Capozi
*Attorney*—Craig, Antonelli and Hill

[57] ABSTRACT

A headlight for vehicles, especially motor vehicles, which is constructed so as to be pivotal from an operating position into an opening of the body; the opening is covered by means of a part made from stretchable material which is retained at the body.

8 Claims, 3 Drawing Figures

PATENTED MAY 22 1973 3,735,114

Inventor:

FERDINAND ALEXANDER PORSCHE

BY: Craig, Antonelli & Hill
ATTORNEYS

HEADLIGHTS FOR VEHICLES

The present invention relates to a headlight for vehicles, especially for motor vehicles, which is pivotally constructed so as to pivot out of an operating position into an opening of the body.

The aim of the present invention is the provision of a pivotal headlight for motor vehicles which excels by an advantageous construction.

With one pivotal headlight (U. S. Pat. No. 2,119,892), the opening of the headlight is covered off by a form-rigid part which is securely mounted at the headlight and is inserted under the formation of a peripheral gap into the opening of the body of the motor vehicle. However, this type of construction entails the disadvantage that water and dirt can penetrate into the interior of the opening through the gap between the cover and the body whereby the mechanism actuating the headlight is disadvantageously impaired in its ability to function. Additionally, the danger exists during the cold season that snow settles in the gap which then may ice up, for example, by the air stream during the drive of the vehicle. This has as a consequence that an actuation of the headlight with the actuating mechanism provided therefor is not possible. Added thereto is the fact that a uniform gap pattern between the cover and body requires the maintenance of accurate tolerances which, according to experience, is expensive.

The aim underlying the present invention essentially consists in so constructing the headlight and the parts surrounding the same that an actuation impairment by water, snow, ice or the like is not possible. In that connection, however, the installation of the cover is to be undertaken without the maintenance of narrow tolerances.

This is achieved, according to the present invention, in that the opening is covered with a part made of an extensible and elastic material which is retained at the body. It is thereby advantageous if the part includes sections which are secured at the body and at the headlight. It is also advantageous if the sections cooperating with the body are offset step-shaped. The sections which cooperate with the headlight are preferably formed by cams or beads which project into grooves of the headlight. It is advantageous if the part possesses a wall thickness in cross section which becomes less from the edges of the opening up to a center longitudinal plane of the headlight. The part includes preferably an extension projecting beyond the diffusing lens of the headlight, which is effective as sealing lip in the rest position of the headlight. It is additionally advantageous if the headlight includes a flange with a sealing lip which in the operating position of the headlight sealingly cooperates with the body.

The advantages which are principally attained with the present invention reside in that a gap extending about the periphery is obviated by the covering of the opening in the body with a part made from an elastic material and the mounting thereof at the body. By the use of such an arrangement not only the mechanism actuating the headlight is well-protected against water and dirt, but also an impairment of the operation of the headlight by frozen-up snow or the like is effectively counteracted. Additionally, by reason of the predominantly gapless connection of the part with the body, a simple insertion of the part is possible without the maintenance of accurate manufacturing tolerances. An expansion of the part satisfactory as regards the proper functioning is made possible by means of the sections which are secured at the body and at the headlight. It is achieved by the step-shaped offset of the section which is secured at the body, that the part is adapted to the form configuration of the body in the rest position of the headlight. The cams, which are provided at the part and which cooperate with the grooves of the headlights, enable a good connection of the two parts without additional securing elements.

The part possesses a wall thickness which becomes smaller in cross section from the edges of the opening up to a center longitudinal plane of the headlight whereby a fluttering of the part is prevented with a retracted headlight. A good seal of the front of the opening in the body is achieved by the projection of the part and the flange of the headlight provided with the sealing body.

These and further objects, features, and advantages of the present invention will become more obvious from the following description when taken in connection with the accompanying drawing which shows, for purposes of illustration only, one embodiment in accordance with the present invention, and wherein.

Figure 1:
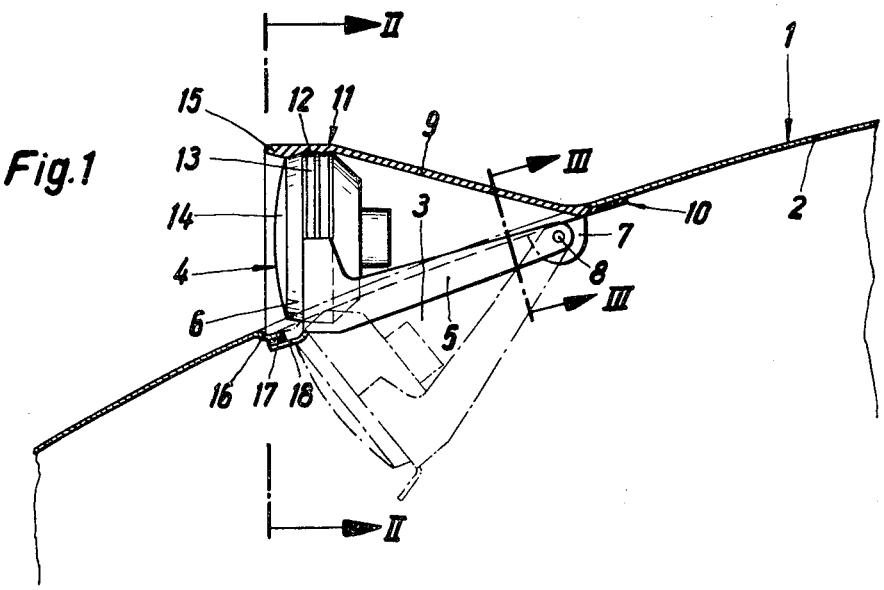
FIG. 1 is a longitudinal cross-sectional view through the front end of a motor vehicle with a headlight in accordance with the present invention.
Figure 2:
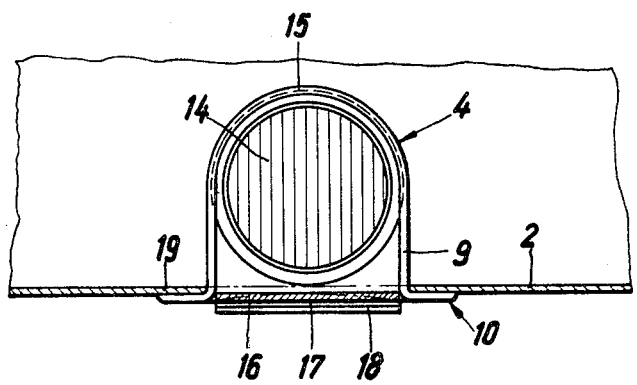
FIG. 2 is a cross-sectional view, taken along line II—II of FIG. 1.

Referring now to the drawing wherein like reference numerals are used throughout the various views, and more particularly to FIG. 1, the motor vehicle illustrated in this figure and generally designated by reference numeral 1 includes a body 2, in which an opening 3 and a headlight generally designated by reference numeral 4 are provided. The headlight is pivotal from its operating position into a retracted, recessed rest position illustrated in FIG. 1 in dash and dot lines. For that purpose, the headlight 4 includes an arm 5 which is securely connected with the headlight housing 6 and cooperates with a bearing 7. The bearing 7 is retained at the body 2 by conventional means and includes bearing pins 8 which are directed transversely to the vehicle longitudinal plane. The actuation of the headlight 4 takes place by an electric motor and by a crank drive which are not illustrated. However, in lieu thereof, also manual adjusting mechanisms or mechanisms controlled by an actuating medium may be used.

The opening 5 in the body 2 is covered by a part 9 that is made from an elastic, extensible material of any known type. The part 9 includes sections 10 and 11 which are conventionally retained at the body 2 and at the headlight 4, respectively. The section 10 is offset step-shaped and is connected with the body 2 by bonding, gluing, or any other suitable fastening means. The sections 11, which cooperate with the headlight 4, include cam portions 12 which project into the grooves 13 of the housing 6 of the headlight 4. In order that also the side of the opening 3 disposed in the driving direction in front of the headlight 4 is well covered in both positions of the headlight 4 against water, dirt, snow or the like, the part 9 is provided with a projection 15 protruding beyond the scattering window 14 of the headlight 4, which projection is effective in the rest position of the headlight 4 as sealing lip and, for that purpose, abuts at an edge 16 of the body 2. In the operating position of the headlight, the seal at the sealing edge 16 takes place by means of a flange 18 provided with a sealing body 17 which is retained at the housing 6 of the headlight 4.

Figure 3:
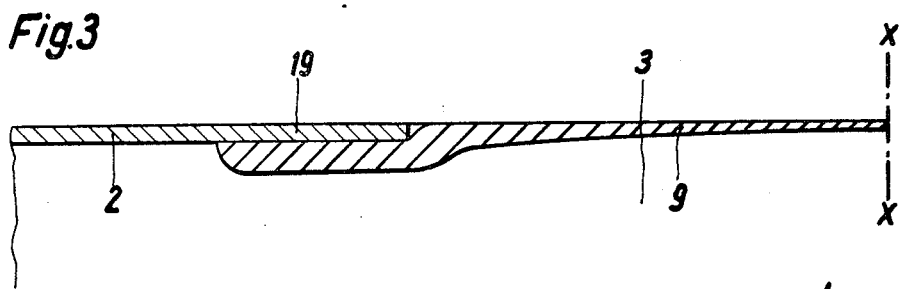
FIG. 3 is a cross-sectional view, taken along line III—III of FIG. 1.

According to FIG. 3, the part 9 has a cross section which decreases in cross section from the edges 19 of the opening 3 up to the center longitudinal plane X—X. An undesired fluttering of the part 9 in the rest position of the headlight is prevented thereby.

If the headlight 4 is pivoted out of its rest position into the operating position (FIG. 1), then the headlight 4 stretches the part 9 into the form provided therefor. During the reaction of the headlight 4, the part 9 becomes unstressed and assumes a shape matched to the configuration of the body.

While I have shown and described one embodiment in accordance with the present invention, it is understood that the same is not limited thereto, but is susceptible of numerous changes and modifications as known to those skilled in the art. Thus, the part 9 is not limited to the illustrated embodiment. For example, it may also be made of an elastic material and may be retained at the body by means of rollers or another type of guide means.

Hence, I do not wish to be limited to the details shown and described herein, but intend to cover all such changes and modifications as are encompassed by the scope of the appended claims.

I claim:

1. A headlight device comprising headlight means movably arranged in a motor vehicle body to be in one of an open operative position and a closed inoperative position, said headlight means being exteriorly disposed from said motor vehicle body when in said operative position and interiorly disposed in said motor vehicle body when in said closed position, and a covering means of a stretchable material, having portions connected to said motor vehicle body and said headlight means, respectively, for covering said headlight means when interiorly disposed in said motor vehicle body, whereby said covering means is stretched in the operative position of said headlight means.

2. A headlight device according to claim 1 wherein said covering means portion connected to said motor vehicle body has a step-shaped offset.

3. A headlight device according to claim 1, wherein said covering means portion connected with the headlight means is constituted by cam means projecting into groove means of a headlight housing.

4. A headlight device according to claim 1, wherein said covering means has a cross-sectional thickness decreasing from the portion connected to said motor vehicle body to a minimum at a center longitudinal plane of the headlight.

5. A headlight device according to claim 1, wherein said covering means portion connected to said headlight means includes an extension projecting beyond a dispersion pane of said headlight means, said projection being effective as a sealed lip in the closed position of said headlight means.

6. A headlight device according to claim 1 wherein said headlight means includes a flange with a sealing means which in the operative position of said headlight means provides a seal with said motor vehicle body.

7. A headlight device according to claim 5, wherein said headlight means includes a flange with a sealing means which provides a seal with said motor vehicle body in the operative position of said headlight means.

8. A headlight device according to claim 1 wherein said headlight means is pivotally mounted in said motor vehicle body.

* * * * *